June 29, 1965 E. O. P. TATTER 3,191,942

SPINDLE ADAPTER

Filed Aug. 30, 1962 2 Sheets-Sheet 1

INVENTOR:
Ernest O. P. Tatter
BY Hofgren, Brady, Wegner, Allen & Stellman
attys 3,191,942

SPINDLE ADAPTER

Ernest O. P. Tatter, Addison, Ill., assignor to Warwick Electronics Inc., a corporation of Delaware Filed Aug. 30, 1962, Ser. No. 220,360
3 Claims. (Cl. 274—10)

This invention relates to a spindle adapter for record changers and more particularly to a spindle adapter facilitating the automatic changing of large hole records in which the adapter has no moving parts resulting in an inexpensive adapter providing long, trouble-free service.

At the present time, there are many different spindle adapters available for use in a record changer by placement over the small hole record spindle to then support a stack of large hole records. Currently available adapters have means mounted within the body thereof functioning to provide shelves for supporting a record stack and separator blades for holding all of the records of the stack except the lowermost record so that the lowermost record may be released by the shelves for movement to the turntable. These movable shelves and blades are operated by the ejector lever of the small hole record spindle. These moving parts add substantially to the cost of the adapter and the manufacturing assembly and also result in an adapter having a relatively short life due to the likelihood of malfunctioning of the movable parts.

An object of this invention is to provide an easily manufactured inexpensive spindle adapter having no moving parts and which utilizes directly the ejector lever of the small hole record spindle for the feeding of a record from a record stack onto a turntable and does not add to the load or torque requirements during feeding of a record as encountered with currently available adapters.

Another object of the invention is to provide a spindle adapter in which the adapter is stationarily mounted and has a generally rectangular cross section with a pair of spaced apart surfaces at the lower end thereof engageable within the periphery of a record hole for guiding a record rotating with the turntable and still having sufficiently limited frictional engagement therewith to permit free rotation of the record relative to the stationary adapter.

Still another object of the invention is to provide a spindle adapter as defined in the preceding paragraph in which a member is provided at the lower end of the adapter for assisting in placement of the adapter in operative position relative to the turntable by advance into the center hole of an eccentrically rotating record on a turntable to move said record into concentric relation which permits advance of the record guiding surfaces at the lower end of the adapter into engagement with the periphery of the last-mentioned record hole and in which a pair of members are provided at the lower end of the adapter to additionally engage the periphery of a record hole and assist the guiding surfaces in guiding of a record rotating on the turntable.

Other objects and advantages will become readily apparent from the following detailed description taken in connection with the accompanying drawings, in which.

Figures 1, 2, 8:
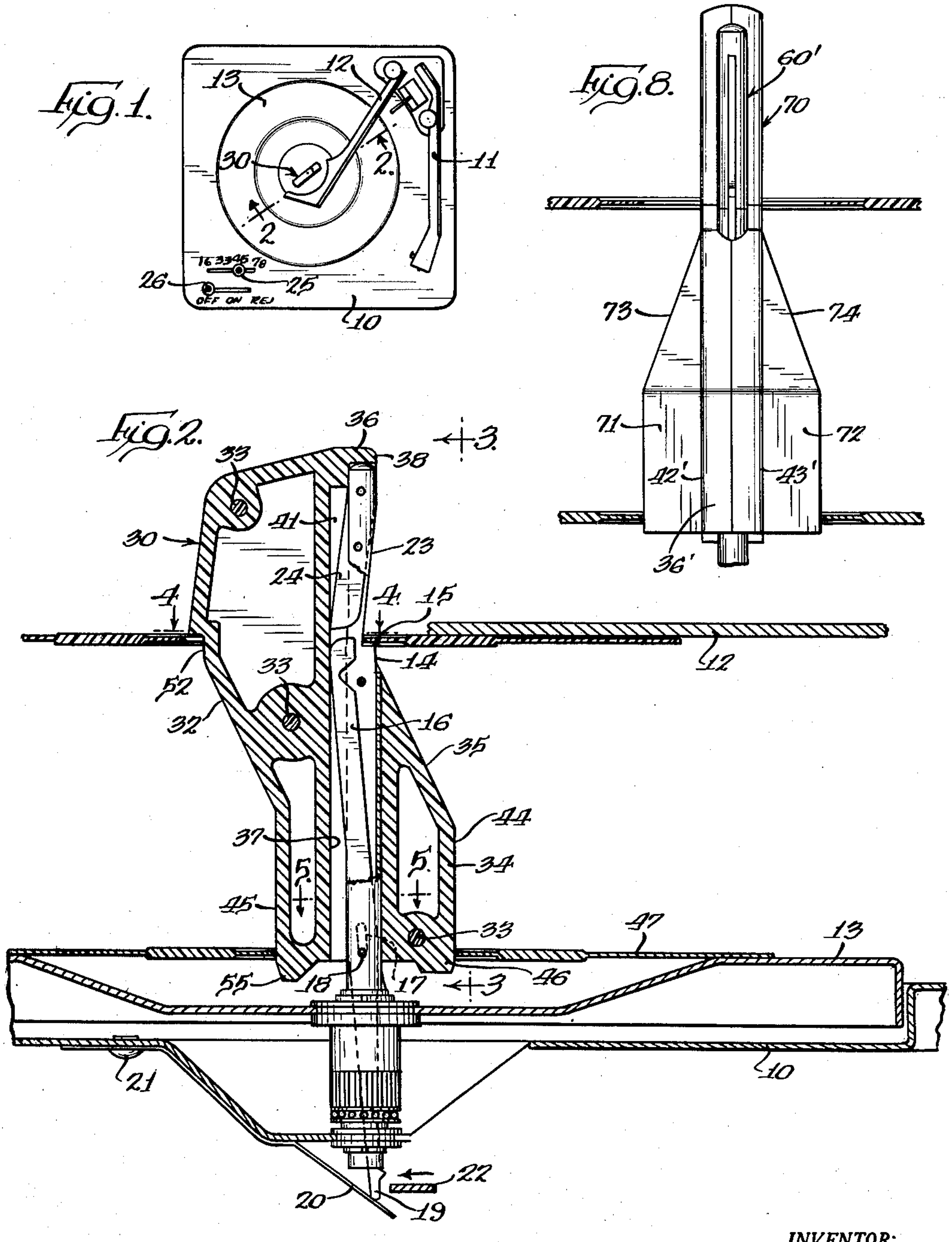
FIG. 1 is a plan view of a record changer showing the hold down arm in operative position.
FIG. 2 is a vertical section on an enlarged scale taken generally along the line 2—2 in FIG. 1 and with records shown on the turntable and supported by the spindle adapter.
FIG. 8 is a view similar to FIG. 3 showing an alternate embodiment of adapter with additional guiding surfaces at the lower end thereof.

While this invention is susceptible of embodiment in many different forms, there is shown in the drawings and will herein be described in detail an embodiment of the invention together with modifications thereof with the understanding that the present disclosure is to be considered as an exemplification of the principles of the invention and is not intended to limit the invention to the embodiments illustrated. The scope of the invention will be pointed out in the appended claims.

Figures 3, 4, 5, 6, 7:
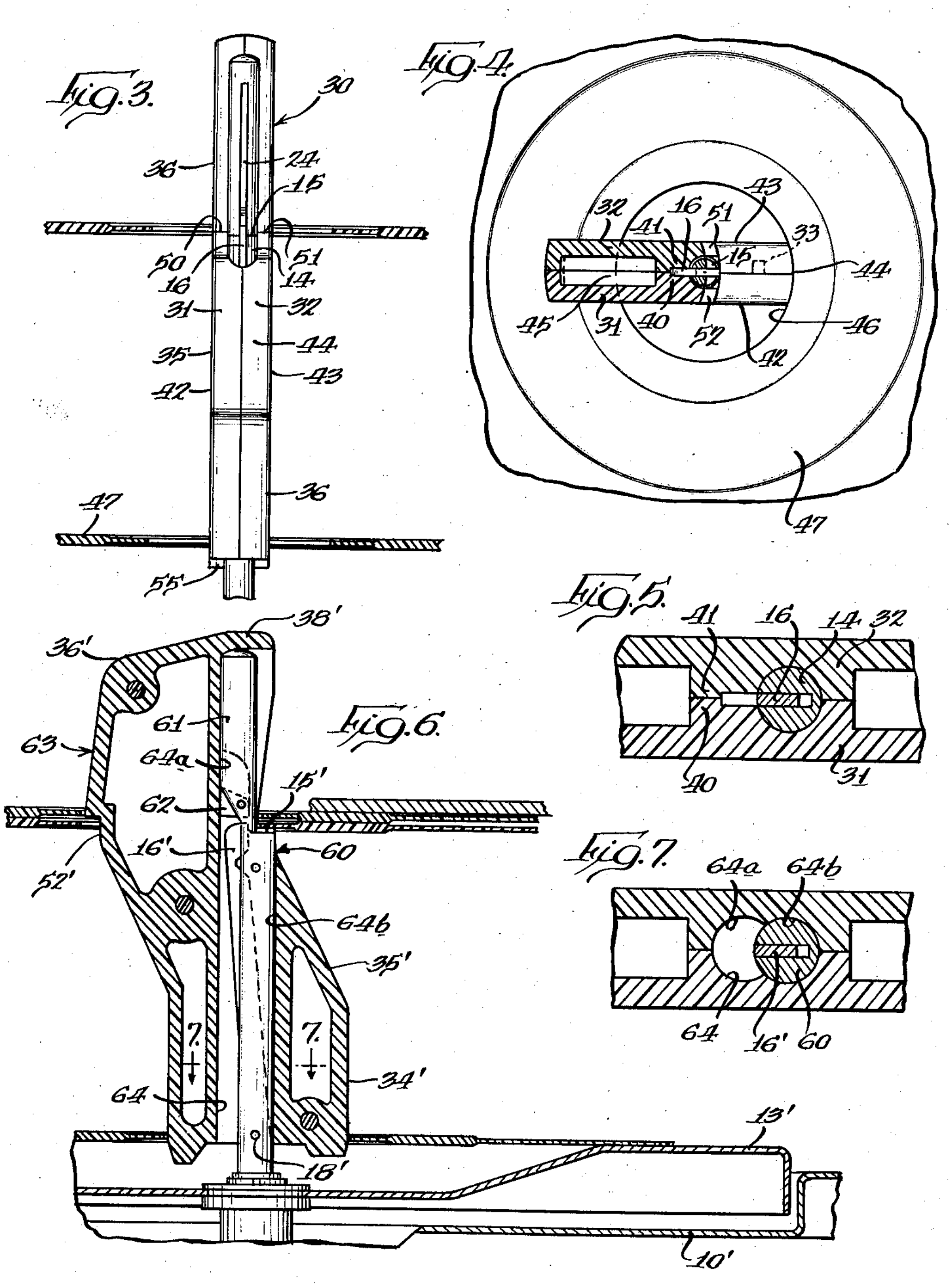
FIG. 3 is an end elevational view of the spindle adapter with a record shown in association therewith and taken generally along the line 3—3 in FIG. 2.
FIG. 4 is a plan section taken generally along the line 4—4 in FIG. 2.
FIG. 5 is a fragmentary plan section taken generally along the line 5—5 in FIG. 2.
FIG. 6 is a view similar to FIG. 2 showing an alternate embodiment of the adapter for association with a different form of small hole record spindle.
FIG. 7 is a fragmentary horizontal section taken generally along the line 7—7 of FIG. 6.

The spindle adapters of this invention are provided for association with a record changer which, as shown in FIG. 1, and, in part, in FIGS. 2 and 6, embodies a motorboard 10 having a tone arm 11 and a record hold down arm 12. The hold down arm 12 has an operative position as shown in FIGS. 1, 2, and 6 in which it rests upon the uppermost record of a record stack to support the stack of records and can move to an inoperative position adjacent the tone arm as shown in FIG. 1 for placement or removal of records.

The changer has a turntable 13 rotatably mounted on the motorboard 10 and a small hole record spindle 14 extends upwardly centrally of the turntable and is fixed to the motorboard so that the turntable rotates relative to the spindle. The small hole record spindle 14 has a record supporting shelf 15 for supporting a stack of small hole records and has pivotally mounted therein a record ejector lever 16 which is mounted for vertical movement as well as pivotal movement by an elongated slot 17 therein engaging a pin 18 fixed to the body of the spindle. A lower end 19 of the ejector lever extends beneath the motorboard for engagement by a spring 20 attached at 21 to the motorboard which urges the ejector lever 16 to an upward retracted position shown in full line in FIG. 2. The ejector lever 16 is pivoted in a clockwise direction, as viewed in FIG. 2, by means of an actuating member 22 operated in timed relation during a record change cycle in a well known manner.

The spindle 14 has an upper end which is concentric with the remainder of the spindle and a face 23 is sloped downwardly and inwardly to provide the shelf 15. This part of the spindle mounts a vertically movable slider member 24 which in the full line position shown in FIG. 2 guides small hole records down onto the shelf 15. As is known in the art, this slider member can move into the body of the spindle when small hole records are raised upwardly off the spindle in order to prevent blocking record movement.

As is conventional with record changers, a manual control member 25 as shown in FIG. 1 is provided to control the speed of the turntable 13 and a second manually operable member 26 controls the on-off operation of the changer.

A first embodiment of the spindle adapter is shown in FIGS. 1 through 5 for use with a small hole record spindle having a concentric upper part as shown in FIG. 2. In this embodiment, a spindle adapter indicated generally at 30 is formed of two similar parts 31 and 32 suitably secured together as by adhesive or, as shown, by a plurality of machine screws 33. The adapter body formed by the parts 31 and 32 is generally rectangular in cross section throughout the height thereof as shown in FIG. 4. The body is defined by a lower section 34, an intermediate section 35, and an upper section 36. Extending longitudinally through the adapter body is a central passage 37 for receiving the small hole record spindle 14 and the height of the adapter relative to the turntable is fixed by engagement of a capped portion 38 of the adapter's upper section with the top of the small hole record spindle. The adapter 30 is held fixed against rotation by engagement of a pair of longitudinally extending flanges 40 and 41 on the adapter parts 31 and 32, respectively, with the slider member 24 of the small hole record spindle 14. The flanges 40 and 41 define an elongate space receiving the slider member and also the rear part of the ejector lever 16. This space at the location of the slider member 24 is slightly narrower so that, with the slider member and ejector lever having the same thickness, the ejector lever will have freedom of motion.

With the rectangular cross section of the adapter 30, a pair of straight sides 42 and 43 are provided which have a length dimension greater than a pair of connecting sides 44 and 45. The sides 44 and 45 have their faces curved to correspond to the curvature of the center hole 46 of a large hole record 47 as shown in FIG. 4 to accurately guide the record during its rotation.

A record supporting shelf for the spindle adapter is provided by a pair of shoulders 50 and 51 formed at the upper end of the adapter central section 35 and which are at a level above the shelf 15 of the small hole record spindle 14, as shown in FIG. 3. The shelf defined by shoulders 50 and 51 supports records independently of th shelf 15 of the small hole record spindle. The curved side 44 of the spindle adapter at the upper section 36 thereof is inclined downwardly and inwardly, as shown in FIG. 2, to permit a record to move onto the adapter shelf and the opposite curved side 45 of the adapter at the upper section 36 is correspondingly sloped downwardly and outwardly as shown in FIG. 2 to positively guide a record down onto the adapter shelf. The sloped side, last referred to, terminates a distance above the adapter shelf at least equal to the thickness of a large hole record, and the adapter is recessed as indicated at 52 so that a record may shift to the right, as viewed in FIG. 2, off the adapter shelf. The passage 37 opens to the exterior of the adapter at the location of the adapter shelf so that the ejector lever 16 of the small hole record spindle when pivoted by the actuating member 22 can move to engage within the hole of a record and shift the record to the right for movement off the adapter shelf and down onto the turntable 13. The intermediate section 35 of the adapter is inclined as shown in FIG. 2 to lead a record down to the lower section 34 which is concentric with the small hole record spindle 14.

Sometimes the adapter 30 may be placed on the small hole record spindle while records are on the turntable 13. Because the holes 46 of the records are much larger than the small hole record spindle 14, the records are not necessarily concentric with the small hole record spindle. A tab 55 is provided at the lower end of the adapter side 45 and coextensive in width therewith so that as the adapter moves down into a record hole which is located eccentrically, the tab causes the record to move to a concentric position and the sides 45 and 46 of the adapter can then move into the record hole. This action is facilitated by the effect of gravity in lowering the adapter 30 along the small hole record spindle 14.

An alternate embodiment of adapter is shown in FIGS. 6 and 7 for association with a small hole record spindle, indicated generally at 60, which has parts corresponding to the small hole record spindle 14 shown in FIG. 2 and to which similar reference numerals have been applied with a prime affixed thereto. The spindle 60 of FIG. 6 has an offset upper part 61 with a pivoted member 62 for guiding records down onto the shelf 15'. The pivoted member 62 can move in a clockwise direction to a position within the spindle upper part 61 to permit removal of small hole records from the spindle. The adapter indicated generally at 63 corresponds to the adapter 30 in all respects except for a slightly different shape caused by an offset of the spindle upper part 61 of the small record hole spindle. The interior passage 64 of the spindle adapter is formed as shown in FIG. 7 with a partially cylindrical passage 64*a* to receive the upper part 61 of the small hole record spindle and a similar offset passage 64*b* to receive the lower part of the spindle 60. The adapter is held locked to the spindle 60 against rotation by the offset of the passages 64*a* and 64*b* of the adapter engaging their coacting parts of the small spindle. Other parts of the adapter 63 correspond to those of the adapter 30 and similar reference numerals have been given thereto with a prime affixed.

Still another embodiment of adapter is shown in FIG. 8. This adapter indicated generally at 70 is the same as the adapter shown in FIG. 3 and similar parts have had the same reference numeral with a prime affixed thereto. The distinction in this adapter over that shown in FIG. 3 is in the use of a pair of guiding members 71 and 72 mounted at the lower end of the adapter body and extending outwardly normal to the adapter faces 42' and 43' to provide added guiding surface for a record supported on the turntable. These guiding members 71 and 72 have an effective height equal to that of the lower section 36' of the spindle with upwardly sloping surfaces 73 and 74 blending into the sides of the adapter.

With the foregoing constructions, a spindle adapter has been provided which may readily be placed over a small hole record spindle and provide for automatic changing of large hole records solely by the use of the ejector mechanism of the small hole record spindle. Additionally, an adapter is provided in which no moving part is disposed within a record mounted on a turntable. This is accomplished by having a limited amount of area of adapter in engagement with the periphery of a record center hole to keep frictional engagement with the record to a minimum while the engaging areas of the adapter are sufficient to properly guide a record that is rotating with the turntable.

I claim:

1. A spindle adapter for use with a record changer having a rotatable turntable and a stationary spindle for records having center holes of small diameter, said spindle having a shiftable ejector member, in combination, an adapter body for supporting and centering a stack of records with large diameter center holes, said body having and axially directed passage for placement on said spindle, means on the adapter body engageable with the spindle to lock the adapter to the spindle and against rotation with the turntable, means defining a support position for large hole records intermediate the top and bottom of the adapter to hold records at a support level, means at the upper part of said body for guiding the lowermost record of a large hole record stack to said support level, said adapter having a generally rectangular shape from top to bottom of a size to fit within the center hole of a large hole record, the lower end adapted to fit within the center hole of a record on the turntable, opposite convexly shaped first and second surfaces at said lower end extending arcuately for a minor part of the record hole periphery to obtain guiding of the record on the turntable with minimal frictional retardation of the record, and opposite generally straight third and fourth surfaces between said first and second surfaces and a distance apart equal to a minor part of the hole diameter of the large hole record to avoid contact with a record hole periphery and thereby avoid frictional contact with a record on the turntable.

2. A spindle adapter as defined in claim 1 in which a pair of guiding fins are located at the lower end of said body and extend from said generally straight sides to increase the dimension of said body in a transverse direction.

3. A spindle adapter as defined in claim 1 and including a tab located at the lower end of the adapter body and projecting therefrom for advancing said body through the center holes of records supported on said turntable as the latter records are rotated relative to said body.

References Cited by the Examiner

UNITED STATES PATENTS

| | | | |
|---|---|---|---|
| 2,651,523 | 9/53 | Dale | 274—10 |
| 2,666,647 | 1/54 | Dale | 274—10 |
| 2,853,305 | 9/58 | Loose | 274—10 |
| 2,884,255 | 4/59 | Wennerbo | 274—10.5 |

LOUIS J. CAPOZI, *Primary Examiner.*

EMIL G. ANDERSON, *Examiner.*